(12) United States Patent
Su et al.

(10) Patent No.: US 9,166,468 B2
(45) Date of Patent: Oct. 20, 2015

(54) VOLTAGE REGULATOR CIRCUIT WITH SOFT-START FUNCTION

(71) Applicant: ASMedia Technology Inc., New Taipei (TW)

(72) Inventors: Ting-Wen Su, New Taipei (TW); Yu-Chuan Lin, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 0 days.

(21) Appl. No.: 14/159,452

(22) Filed: Jan. 21, 2014

(65) Prior Publication Data

US 2014/0218000 A1 Aug. 7, 2014

(30) Foreign Application Priority Data

Feb. 4, 2013 (TW) .............................. 102104224 A

(51) Int. Cl.
*H02M 3/156* (2006.01)
*H02M 1/36* (2007.01)

(52) U.S. Cl.
CPC ................ *H02M 1/36* (2013.01); *H02M 3/156* (2013.01)

(58) Field of Classification Search
USPC .......................................... 323/282–288, 901
See application file for complete search history.

(56) References Cited

U.S. PATENT DOCUMENTS

| 6,969,977 | B1 | 11/2005 | Smith | |
|---|---|---|---|---|
| 7,215,108 | B2* | 5/2007 | Inn et al. | 323/285 |
| 7,352,162 | B1* | 4/2008 | Chang et al. | 323/290 |
| 7,782,038 | B2* | 8/2010 | Klein | 323/285 |
| 7,868,595 | B1 | 1/2011 | Smith | |
| 2003/0020442 | A1 | 1/2003 | Hwang | |

FOREIGN PATENT DOCUMENTS

| TW | 200713766 A | 4/2007 |
|---|---|---|
| TW | 200746600 A | 12/2007 |
| TW | 201034359 A | 9/2010 |
| TW | I342659 B | 5/2011 |
| TW | 201218594 | 5/2012 |
| WO | 2012148977 A1 | 11/2012 |

* cited by examiner

*Primary Examiner* — Timothy J Dole
*Assistant Examiner* — Ishrat Jamali
(74) *Attorney, Agent, or Firm* — CKC & Partners Co., Ltd.

(57) ABSTRACT

A voltage regulator circuit includes a soft start module, a pulse width modulation (PWM) module, and a voltage regulator module. The soft start module is used to receive a current feedback voltage corresponding to an input current, and compare the current feedback voltage with a comparison voltage, so as to output a switching signal. The PWM module is used to receive a clock signal and the switching signal, and determine a first PWM signal and a second PWM signal outputted by the PWM module is a high voltage level or a low voltage level according to the clock signal and the switching signal. The voltage regulator module is used to receive and adjust an output voltage corresponding to the first PWM signal and the second PWM signal.

8 Claims, 4 Drawing Sheets

US 9,166,468 B2

VOLTAGE REGULATOR CIRCUIT WITH SOFT-START FUNCTION

CROSS-REFERENCE TO RELATED APPLICATION

This application claims the priority benefit of Taiwan application serial No. 102104224 filed on Feb. 4, 2013. The entirety of the above-mentioned patent application is hereby incorporated by reference herein and made a part of specification.

BACKGROUND OF THE INVENTION

1. Field of the Invention
This disclosure relates to a voltage regulator circuit.
2. Description of the Related Art
With the development of electronic technology, various voltage regulator circuits are used in an electronic device commonly such as a direct current (DC) voltage regulator circuit or an alternating current (AC) voltage regulator circuit.

A pulse width modulation (PWM) voltage regulator is a common DC voltage regulator. Generally, when the PWM voltage regulator starts and the output voltage rapidly changes, a high inrush current is generated. The inrush current may damage components of the circuit or make an input source provided to the PWM voltage regulator generate a voltage drop, and affect other circuits connected to the input source.

BRIEF SUMMARY OF THE INVENTION

A voltage regulator circuit is provided. The voltage regulator circuit is used to electrically connect to an input source and an output voltage is outputted by the voltage regulator circuit. The voltage regulator circuit includes a soft start module, a PWM module and a voltage regulator module. The soft start module is used to receive a current feedback voltage corresponding to an input current and compare the current feedback voltage with a comparison voltage, so as to output a switching signal. The PWM module is used to receive a clock signal and the switch signal, and determine whether a first PWM signal and a second PWM signal outputted by the PWM module are a high voltage level or a low voltage level according to the clock signal and the switch signal. The voltage regulator module is used to receive and adjust an output voltage corresponding to the first PWM signal and the second PWM signal.

DETAILED DESCRIPTION OF THE EMBODIMENTS

In the following, "electrically connected" represents that two or more components are electrically or physically connected with each other directly or indirectly, and it also can be that two or more components have mutual operations and actions.

Figure 1:
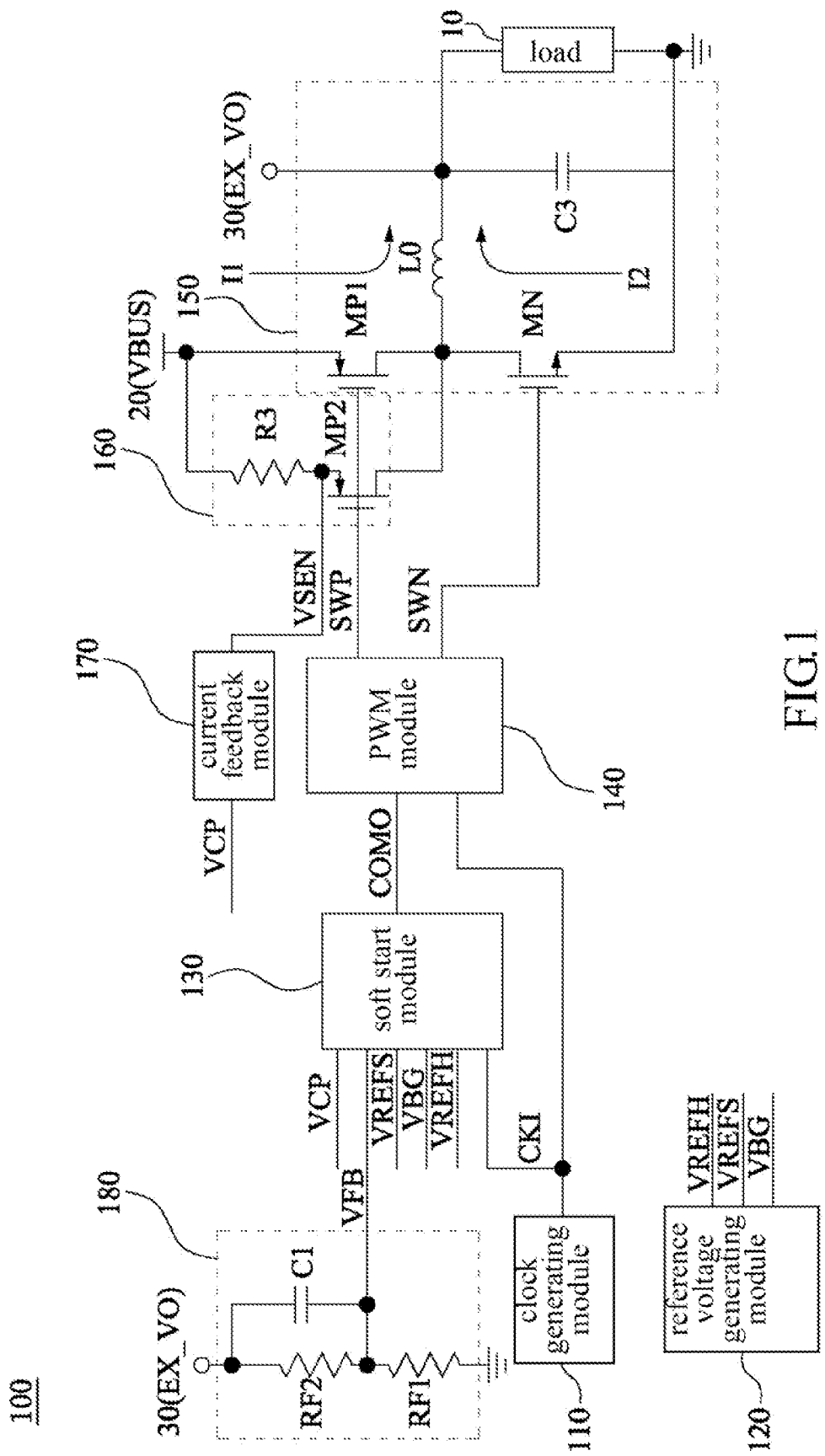
FIG. 1 is a schematic diagram showing a voltage regulator circuit in one embodiment.

FIG. 1 is a schematic diagram showing a voltage regulator circuit 100 in one embodiment. The voltage regulator circuit 100 includes a clock generating module 110, a reference voltage generating module 120, a soft start module 130, a PWM module 140, a voltage regulator module 150, a current detecting module 160, a current feedback module 170 and a voltage division module 180.

The clock generating module 110 is electrically connected to the soft start module 130 and the PWM module 140. The reference voltage generating module 120 is electrically connected to the soft start module 130. The soft start module 130 is electrically connected to the PWM module 140 and the voltage division module 180. The PWM module 140 is electrically connected to the voltage regulator module 150 and the current detecting module 160. The voltage regulator module 150 is electrically connected to the current detecting module 160, a load 10, an input source 20 and an output terminal 30. The current feedback module 170 is electrically connected to the current detecting module 160 and the soft start module 130. The voltage division module 180 is electrically connected to the output terminal 30.

The clock generating module 110 is used to output a clock signal CKI to the soft start module 130 and the PWM module 140.

The reference voltage generating module 120 is used to output a first reference voltage VREFH, a second reference voltage VBG and an initial reference voltage VREFS to the soft start module 130. The values of the reference voltages are adjusted according to demands.

The PWM module 140 is used to receive the clock signal CKI and a switch signal COMO and determine whether a first PWM signal SWP and a second PWM signal SWN are a low voltage level or a high voltage level according to the clock signal CKI and the switch signal COMO.

The voltage regulator module 150 is used to receive the first PWM signal SWP and the second PWM signal SWN. An input current I1 and an inductive current I2 are controlled by the voltage regulator module 150 according to the first PWM signal SWP and the second PWM signal SWN.

The current detecting module 160 is used to detect the input current I1 and outputs a detecting voltage VSEN to the current feedback module 170 according to the input current I1. The current feedback module 170 is used to receive the detecting voltage VSEN and outputs a current feedback voltage VCP to the soft start module 130 according to the detecting voltage VSEN. The voltage division module 180 is used to receive an output voltage EX_VO and provides a feedback voltage VFB to the soft start module 130 according to the output voltage EX_VO.

The soft start module 130 is used to compare the current feedback voltage VCP corresponding to the input current I1 and a comparison voltage ERRO to output a switch signal COMO.

The detail of the voltage regulator circuit 100 will be illustrated hereinafter, but which is not limited.

As shown in FIG. 1, in one embodiment, the voltage regulator module 150 includes a high side switch MP1, a low side switch MN, a inductor L0 and a capacitor C3. The high side switch MP1 and the low side switch MN include a first terminal, a second terminal and a control terminal, respectively. The first terminal of the high side switch MP1 is electrically connected to the input source 20, the second terminal of the high side switch MP1 is electrically connected to the first terminal of the inductor L0 and the first terminal of the low side switch MN, and the control terminal of the high side switch MP1 is electrically connected to the PWM module 140. The control terminal of the low side switch MN is electrically connected to the PWM module 140. The second terminal of the inductor L0 is electronically connected to the load 10, the output terminal 30 and a first terminal of the capacitor C3.

The high side switch MP1 is used to receive an input voltage VBUS and the first PWM signal SWP, and the high side switch MP1 is turned on according to the first PWM signal SWP with the low voltage level to make the input source 20 provide the input current I1 to charge the capacitor C3 through the inductor L0. The low side switch MN is used to receive the second PWM signal SWN, and the low side switch MN is turned on according to the second PWM signal SWN with the high voltage level to make the inductive current I2 charge the second capacitor C3 through the low side switch MN and the inductor L0. Moreover, the first PWM signal SWP with the low voltage level and the second PWM signal SWN with the high voltage level are outputted in sequence, so as to make the high side switch MP1 and the low side switch MN not turned on simultaneously to avoid that the input source 20 is connected to ground.

The current detecting module 160 includes a resistor R3 and a transistor MP2. The transistor MP2 includes a first terminal, a second terminal and a control terminal. The resistor R3 includes a first terminal and a second terminal. The first terminal of the resistor R3 is electrically connected to the input source 20 and the first terminal of the high side switch MP1, the second terminal of the resistor R3 is electrically connected to the first terminal of the transistor MP2. The second terminal of the transistor MP2 is electrically connected to the second terminal of the high side switch MP1, the control terminal of the transistor MP2 is electrically connected to the control terminal of the high side switch MP1 and the PWM module 140.

The ratio between the channel width of the high side switch MP1 and that of the transistor MP2 is 1:K, wherein K is much larger than 1 (such as hundreds to thousands), to make the ratio between the current of the high side switch MP1 and that of the transistor MP2 is approximately equal to the ratio of the channel widths. When the input current I1 flows through the high side switch MP1, the detecting current corresponding to the input current I1 flows through the resistor R3 and the transistor MP2. Consequently, the value of the input current I1 can be detected by detecting the voltage across the resistor R3.

The current feedback module 170 is electrically connected to the second terminal of the resistor R3 to receive the detecting voltage VSEN. The current feedback module 170 may be an amplifier. The current feedback module 170 can be a negative gain amplifier, when the detecting voltage VSEN is the input voltage VBUS (the input current I1 is 0), the current feedback module 170 may output the initial reference voltage VREFS to be regarded as the current feedback voltage VCP. When the detecting voltage VSEN is smaller than the input voltage VBUS (the input current I1 is larger than 0), the current feedback module 170 may make the current feedback voltage VCP increase with the decrease of the detecting voltage VSEN.

The voltage division module 180 further includes resistors RF1 and RF2 and a capacitor C1, and the voltage division module is electrically connected to the output terminal. The resistor RF2 is connected in parallel to the capacitor C1, and connected in series to the resistor RF1. The resistors RF1, RF2 are used to divide the input voltage EX_VO and output the feedback voltage VFB to the soft start module 130.

Figure 2:
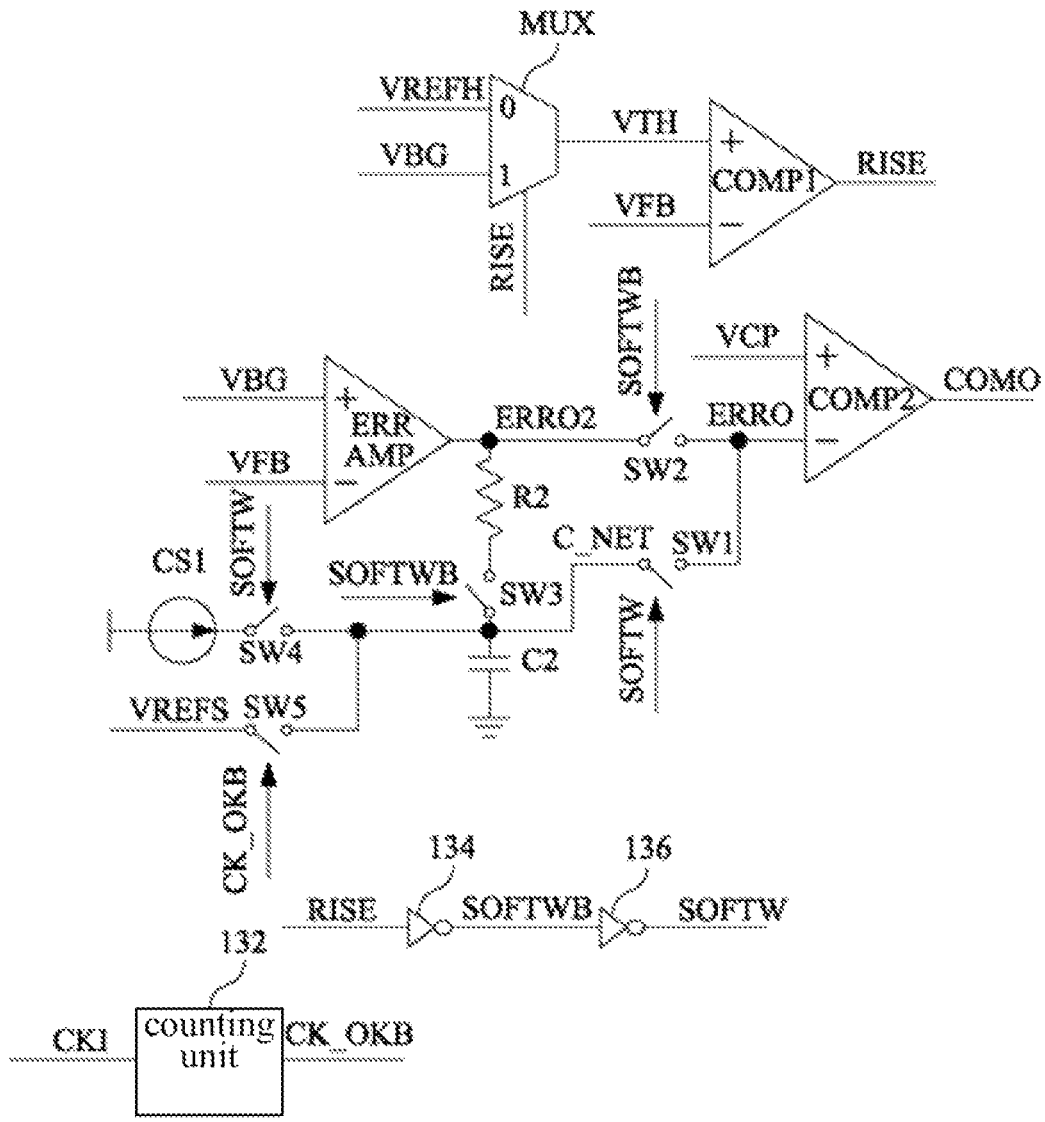
FIG. 2 is a schematic diagram showing a soft start module in one embodiment.

As shown in FIG. 2, the soft start module 130 includes a comparator COMP2, a capacitor C2, a resistor R2, a differential amplifier ERRAMP, a current source CS1 and switches SW1 to SW4. The comparator COMP2 and the differential amplifier ERRAMP include a first input terminal, a second input terminal and an output terminal, respectively. The capacitor C2 and the resistor R2 include a first terminal and a second terminal, respectively. The switches SW1 to SW4 include a first terminal, a second terminal and a control terminal, respectively.

The first terminal of the capacitor C2 is electrically connected to the first terminal of the switch SW1, the second terminal of the switch SW3 and the second terminal of the switch SW4. The second terminal of the capacitor C2 is connected to ground. The first terminal of the resistor R2 is electrically connected to the output terminal of the differential amplifier ERRAMP and the first terminal of the switch SW2, and the second terminal of the resistor R2 is electrically connected to the first terminal of the switch SW3. The first input terminal of the differential amplifier ERRAMP is used to receive the second reference voltage VRG, and the second input terminal of the differential amplifier is used to receive the feedback voltage VFB. The first terminal of the comparator COMP2 is used to receive the current feedback voltage VCP, the second terminal of the comparator COMP2 is electrically connected to the second terminal of the switch SW1. The current source CS1 is electrically connected to the first terminal of switch SW4. The control terminals of the switch SW1, SW4 are used to receive a soft start signal SOFTW. The control terminals of the switches SW2, SW3 are used to receive a stable signal SOFTWB.

The comparator COMP2 is used to compare the current feedback voltage VCP and the comparison voltage ERRO, and selectively output the switch signal COMO with the low voltage level or the high voltage level accordingly. The differential amplifier ERRAMP is used to compare the second reference voltage VBG and the feedback voltage VFB, and output the differential voltage ERRO2. The switch SW1 is used to turn on according to the soft start signal SOFTW to connect the first terminal of the capacitor C2 and the second terminal of the comparator COMP2, and the voltage (that is the fine voltage C_NET) of the first terminal of the capacitor C2 is provided to the comparator COMP2 to be the comparison voltage ERRO. The switch SW4 is used to turn on according to the soft start signal SOFTW to connect the current source CS1 and the first terminal of the capacitor C2, so as to make the current source CS1 charge the capacitor C2. The switch SW2 is turned on according to the stable signal SOFTWB to connect the output terminal of the differential amplifier ERRAMP and the second input terminal of the comparator COMP2, and the differential voltage ERRO2 is taken as the comparison voltage ERRO, and the voltage regulator circuit 100 forms a negative feedback circuit. The switch SW2 is used to turn on according to the stable signal SOFTWB to connect the output terminal of the differential amplifier ERRAMP and the capacitor C2 through the resistor R2, so as to make the resistor R2 and the capacitor C2 is taken as a frequency compensation circuit of the voltage regulator circuit 100 and the frequency of the voltage regulator circuit 100 is compensated to avoid that the voltage regulator circuit 100 oscillates.

Moreover, the soft start module 130 may further include an initialize switch SW5, a counting unit 132, NOT gates 134 and 136, a comparator COMP1 and a multiplexer MUX.

The counting unit 132 is used to receive the clock signal CKI to count the initial period, and output an initial signal CK_OKB accordingly.

The initial switch SW5 includes a first terminal, a second terminal and a control terminal. The first terminal of the initial switch SW5 is used to receive the initial reference voltage VREFS, the second terminal of the initial switch SW5 is electrically connected to the first terminal of the capacitor C2, and the control terminal of the initial switch SW5 is used to receive the initial signal CK_OKB. The initial switch SW5 is turned on according to the initial signal CK_OKB to make the initial voltage VREFS provided to the capacitor C2.

The multiplexer MUX includes a first terminal, a second terminal, a control terminal and an output terminal. The comparator COMP1 includes a first input terminal, a second input terminal and an output terminal. The first terminal, the second terminal of the multiplexer MUX receive the first reference voltage VREFH and the second reference voltage VBG respectively, the output terminal of the multiplexer MUX is electrically connected to the first input terminal of the comparator COMP1. The second input terminal of the comparator COMP1 is used to receive the feedback voltage VFB. The comparator of the output terminal COMP1 is electrically connected to the control terminal of the multiplexer MUX.

The multiplexer MUX is used to provide the first reference voltage VREFH or the second reference voltage VBG to the comparator COMP1 selectively, and the provided reference voltage is used as a threshold voltage VTH. The comparator COMP1 is used to compare the feedback voltage VFB and the threshold voltage VTH to output a boost signal RISE.

Moreover, the NOT gate 134 is used to receive the boost signal RISE and outputs the stable signal SOFTWB whose phase is opposite to the phase of the boost signal RISE. The NOT gate 136 is used to receive the stable signal SOFTWB and outputs the soft start signal SOFTW whose phase is opposite to the phase of the stable signal SOFTWB.

Figure 3:
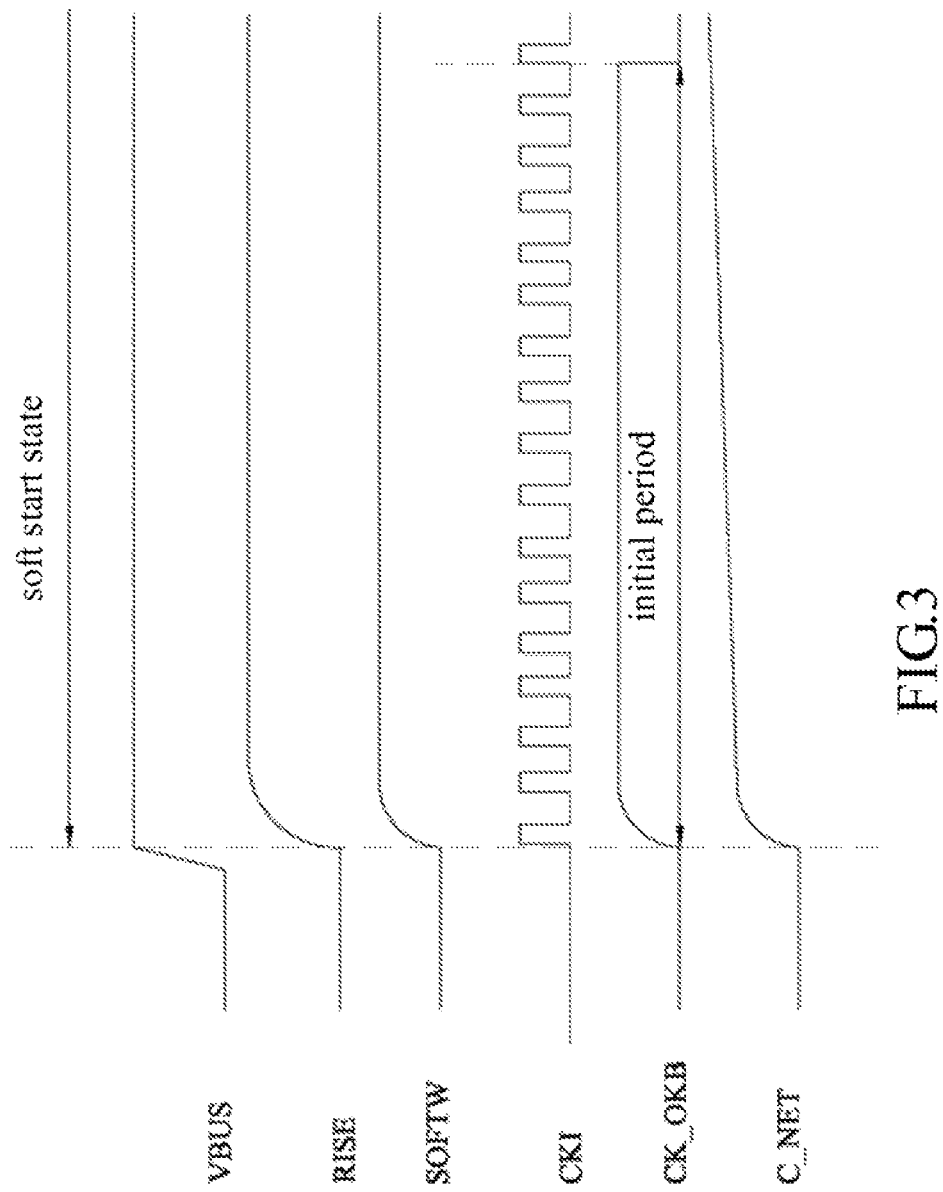
FIG. 3 is a signal sequence diagram of the voltage regulator circuit in FIG. 1 in one embodiment.
Figure 4:
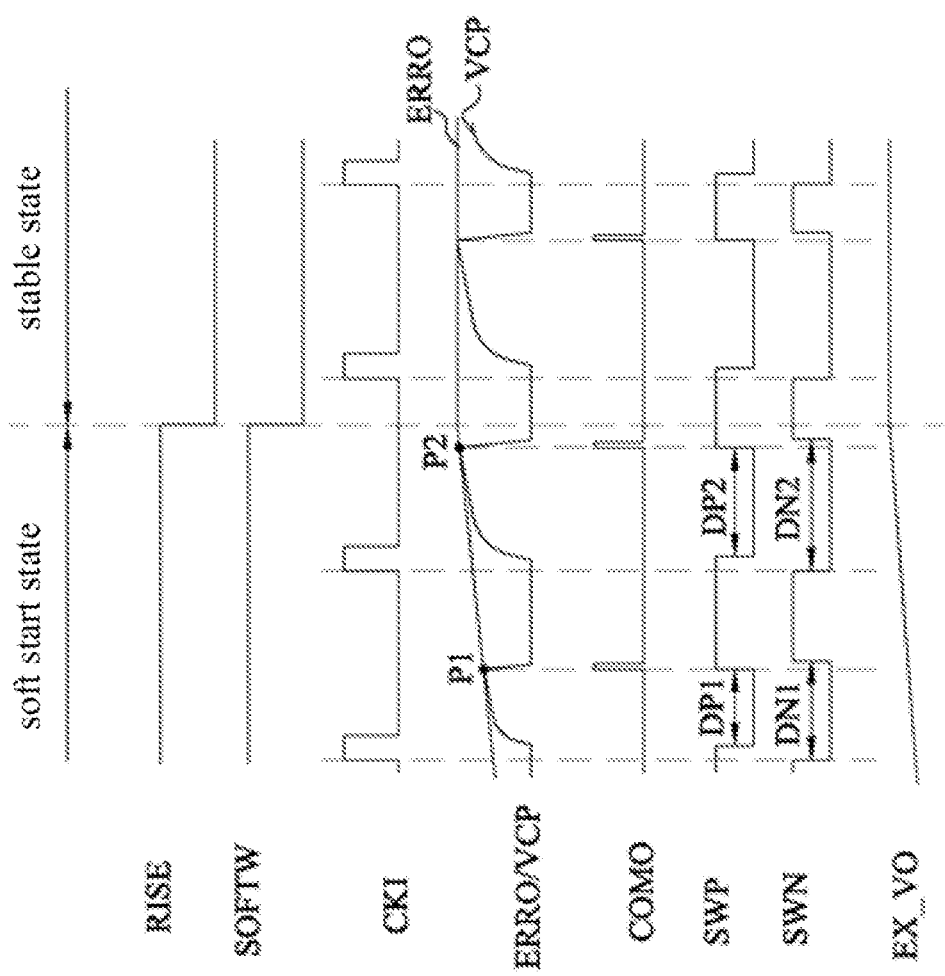
FIG. 4 is a signal sequence diagram of the voltage regulator circuit in FIG. 1 in one embodiment.

FIG. 3 and FIG. 4 are signal sequence diagrams of the voltage regulator circuit in FIG. 1 in different embodiments. Then, the operation of the voltage regulator circuit 100 is further illustrated in the following with reference to FIG. 1 and FIG. 2.

As shown in FIG. 3, when the input voltage VBUS is turned on (for example, it is switched from the low voltage level to the high voltage level), the voltage regulator circuit 100 enters into the soft start state, the clock generating module 110 starts to generate the clock signal CKI. At the moment, the counting unit 132 counts the initial period according to the clock signal CKI (such as 16 cycles of the clock signal CKI), and outputs the initial signal CK_OKB in the initial period (for example, output the high voltage level) to the initial switch SW5 to turn on the initial switch SW5 and make the initial reference voltage VREFS provided to the capacitor C2, and then the capacitor C2 can be charged quickly to the reference voltage VREFS.

Moreover, when the input voltage VBUS is turned on, since the feedback voltage VFB is 0 and the first reference voltage VREFH and the second reference voltage VBG are larger than 0, the comparator COMP1 outputs the boost signal RISE (for example output the high voltage level) to make the multiplexer MUX provide the second reference voltage VBG to the comparator COMP1 to be used as the threshold voltage VTH. The NOT gate 134 outputs the stable signal SOFTWB with the low voltage level, and also make the NOT gate 136 output the soft start signal SOFTW with the high voltage level. At this moment, the switches SW2 and SW3 are turned off and the switches SW1 and SW4 are turned on to make the current source CS1 charge the capacitor C2, and make the voltage of the first terminal of the capacitor C2 (that is the line voltage C_NET) provided to the comparator COMP2 to be used as the comparison voltage ERRO.

When the initial period finishes, the counting unit 132 outputs the initial signal CK_OKB with the low voltage level to the initial switch SW5 to turn off the initial switch SW5. At this moment, only the current source CS1 charges the capacitor C2. If the output current of the current source CS1 is small, the voltage of the capacitor C2 increases slowly.

As shown in FIG. 4, in the soft start state, the comparator COMP2 compares the current feedback voltage VCP and the comparison voltage ERRO corresponding to the voltage across the capacitor C2. When the current feedback voltage VCP is smaller than the comparison voltage ERRO, the comparator COMP2 outputs the switch signal COMO with the low voltage level. When the current feedback voltage VCP is larger than the comparison voltage ERRO, the comparator COMP2 outputs the switch signal COMO with the high voltage level.

When the PWM module 140 receives the switch signal COMO at the low voltage level and the clock signal CKI at the positive edge, which outputs the second PWM signal SWN with the low voltage level to the low side switch MN to turn off the low side switch MN and outputs the first PWM signal SWP with the low voltage level to the high side switch MP1 to turn on the high side switch MP1. The input source 20 provides the input current I1 to charge the capacitor C3 through the inductor L0.

When receiving the switch signal COMO with the high voltage level, the PWM module 140 outputs the first PWM signal SWP with the high voltage level to the high side switch MP1 to turn of the high side switch MP1 and outputs the second PWM signal SWN of high voltage level to the low side switch MN to turn on the low side switch MN. The inductive current I2 charges the capacitor C3 through the low side switch MN and the inductor L0. In the state of soft start, the output voltage EX_VO increases continually.

Moreover, in the soft start state, since the comparison voltage ERRO equals to the voltage across the capacitor C2, the comparison voltage ERRO increases slowly. Correspondingly, the current feedback voltage VCP (such as voltages P1 and P2) increases gradually when it is larger than the comparison voltage ERRO (for example the voltage P2 is larger than the voltage P1), and the time of the comparator COMP2 outputting the switch signal COMO with the high voltage level is delayed. Furthermore, the period of turning the high side switch MP1 on (such as periods DP1 and DP2) and the period of turning the low side switch MN off (such as periods DN1, DN2) increase gradually (for example, the period DP2 is larger than the period DP1 and the period DN2 is larger than the period DN1).

When the feedback voltage VFB increases to be larger than the threshold voltage VTH (the second reference voltage VBG at this moment), the voltage regulator circuit 100 enters into a stable state. At this moment, the comparator COMP1 stops outputting the boost signal RISE (that is to output the low voltage level) to make the multiplexer MUX provide the first reference voltage VREFH to the comparator COMP1 to be used as the threshold voltage VTH, and make the NOT gate 134 output the stable signal SOFTWB with the high voltage level, and the NOT gate 136 outputs the soft start signal SOFTW with the low voltage level. Correspondingly, the switches SW1 and SW4 are turned off and the switches SW2 and SW3 are turned on, the differential voltage ERRO2 are provided to the comparator COMP2 to be used as the comparison voltage ERRO, and thus the voltage regulator circuit 100 forms the negative feedback circuit. Moreover, the capacitor C2 is connected to the output terminal of the differential amplifier ERRAMP, the resistor R2 and the capacitor C2 are taken to be the frequency compensation circuit of the voltage regulator circuit 100 to avoid that voltage regulator circuit 100 generates oscillation.

Furthermore, in the stable state, the operations of the clock generating module 110, the operations of the reference voltage generating module 120, the PWM module 140, the voltage regulator module 150, the current detecting module 160, the current feedback module 170 and the voltage division module 180 are same to that in the soft start state, which is omitted herein. Additionally, in the stable state, the period of turning the high side switch MP1 on and the period of turning the low side switch MN off are constant, and thus the output voltage EX_VO also remains constant.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A voltage regular circuit electrically connected to an input source, wherein the input source includes an input current, the voltage regular circuit outputs an output voltage, and the voltage regular circuit comprising:
    a soft start module, wherein the soft start is used to receive a current feedback voltage corresponding to the input current, and compare the current feedback voltage to a comparison voltage to output a switch signal;
    a pulse width modulation (PWM) module electrically connected to the soft start module, wherein the PWM module is used to receive a clock signal and the switch signal, and determine whether a first PWM signal and a second PWM signal are high voltage level or low voltage level according to the clock signal and the switch signal;
    a voltage regular module electrically connected to the PWM module, wherein the voltage regular module is used to receive the first PWM signal and the second PWM signal and adjust the output voltage according to the first PWM signal and the second PWM signal, and wherein the voltage regular module includes:
        a high side switch electrically connected to the input source and the PWM module to receive the first PWM signal and turned on selectively according to the first PWM signal; and
        a low side switch electrically connected to the PWM module to receive the second PWM signal turned on selectively according to the second PWM signal;
    a current detecting module connected in parallel to the high side switch to detect the input current to provide a detecting voltage corresponding to the input current; and
    a current feedback module used to receive the detecting voltage and provide the current feedback voltage to the soft start module according to the detecting voltage.

2. The voltage regular circuit according to claim 1, wherein the soft start module includes:
    a comparator used to compare the current feedback voltage and the comparison voltage to output the switch signal;
    a first capacitor electrically connected to the comparator, wherein the first capacitor is used to selectively provide a line voltage to the comparator to be used as the comparison voltage; and
    a current source electrically connected to the first capacitor, wherein the current source charges the first capacitor selectively.

3. The voltage regular circuit according to claim 2, wherein the soft start module further includes a differential amplifier, the differential amplifier is used to receive and compare a reference voltage and a feedback voltage corresponding to the output voltage to selectively provide a differential voltage to the comparator to be used as the comparison voltage.

4. The voltage regular circuit according to claim 3, wherein in a soft start state, the current source charges the first capacitor, and the first capacitor provides the line voltage to the comparator to be the comparison voltage.

5. The voltage regular circuit according to claim 3, wherein in a stable state, the differential amplifier provides the differential voltage to the comparator to be used as the comparison voltage.

6. The voltage regular circuit according to claim 5, wherein in the stable state, the differential amplifier is connected to the first capacitor.

7. The voltage regular circuit according to claim 2, wherein the soft start module further includes a counting unit for receiving the clock signal and counting an initial period according the clock signal, and the first capacitor receives an initial reference voltage in the initial period.

8. The voltage regular circuit according to claim 1, wherein the current detecting module includes:
    a transistor; and
    a resistor connected in series to the transistor, wherein the input current flowing through the high side switch has a preset ratio relation with the current flowing through the transistor, and the current flowing through the transistor forms a detecting voltage at the resistor.

\* \* \* \* \*